United States Patent [19]

Wong

[11] Patent Number: 4,733,083
[45] Date of Patent: Mar. 22, 1988

[54] LIGHT GUIDES FOR A POSITRON EMISSION TOMOGRAPHY CAMERA

[75] Inventor: Wai-Hoi Wong, Houston, Tex.

[73] Assignee: Clayton Foundation for Research, Houston, Tex.

[21] Appl. No.: 875,804

[22] Filed: Jun. 18, 1986

[51] Int. Cl.⁴ .............................................. G01T 1/20
[52] U.S. Cl. .................................. 250/363 S; 250/368
[58] Field of Search ..................... 250/363.03, 363.04, 250/363.05, 363.08, 368, 363 S

[56] References Cited

U.S. PATENT DOCUMENTS

| | | | |
|---|---|---|---|
| 3,509,341 | 4/1970 | Hindel et al. | 250/363.8 |
| 4,095,107 | 6/1978 | Genna et al. | 250/363.4 |
| 4,563,582 | 1/1986 | Mullani | 250/363 S |
| 4,642,464 | 2/1987 | Mullani | 250/366 |
| 4,647,779 | 3/1987 | Wong | 250/363.3 |
| 4,677,299 | 6/1987 | Wong | 250/363.3 |

FOREIGN PATENT DOCUMENTS 1406685 9/1975 United Kingdom .

Primary Examiner—Janice A. Howell
Assistant Examiner—William F. Rauchholz
Attorney, Agent, or Firm—Fulbright & Jaworski

[57] ABSTRACT

A positron emission tomography camera having a plurality of scintillation crystal planes positioned side-by-side around a patient area to detect radiation therefrom and forming adjacent rows of crystals transverse to the planes. Each row of each plane has a plurality of crystals and a row of light detectors are positioned adjacent each row of crystals. A row of slanting light guides are positioned between the crystals and the coacting detectors. The light guides are equal in number to the crystals and have a first end adjacent to one crystal and a second end positioned adjacent the detectors. The second ends of the light guides are axially offset in the rows a different amount from each other for providing an identification to the detectors of which crystal detects radiation.

9 Claims, 9 Drawing Figures

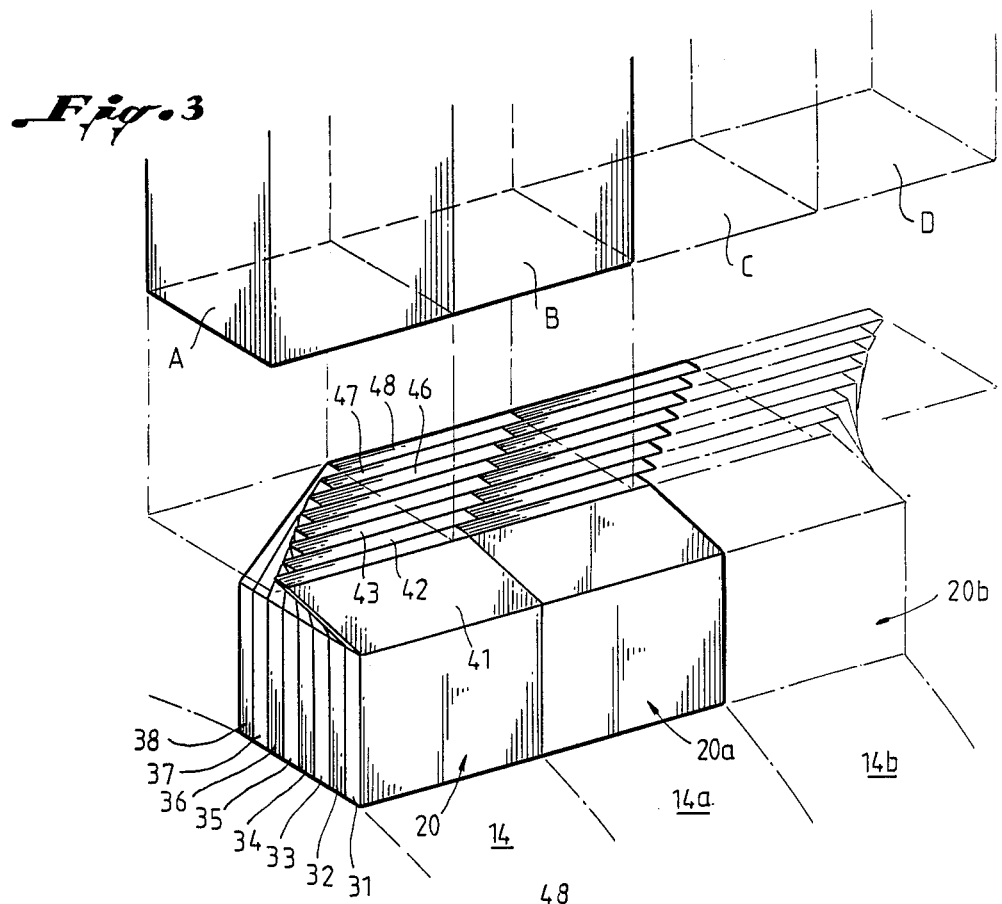
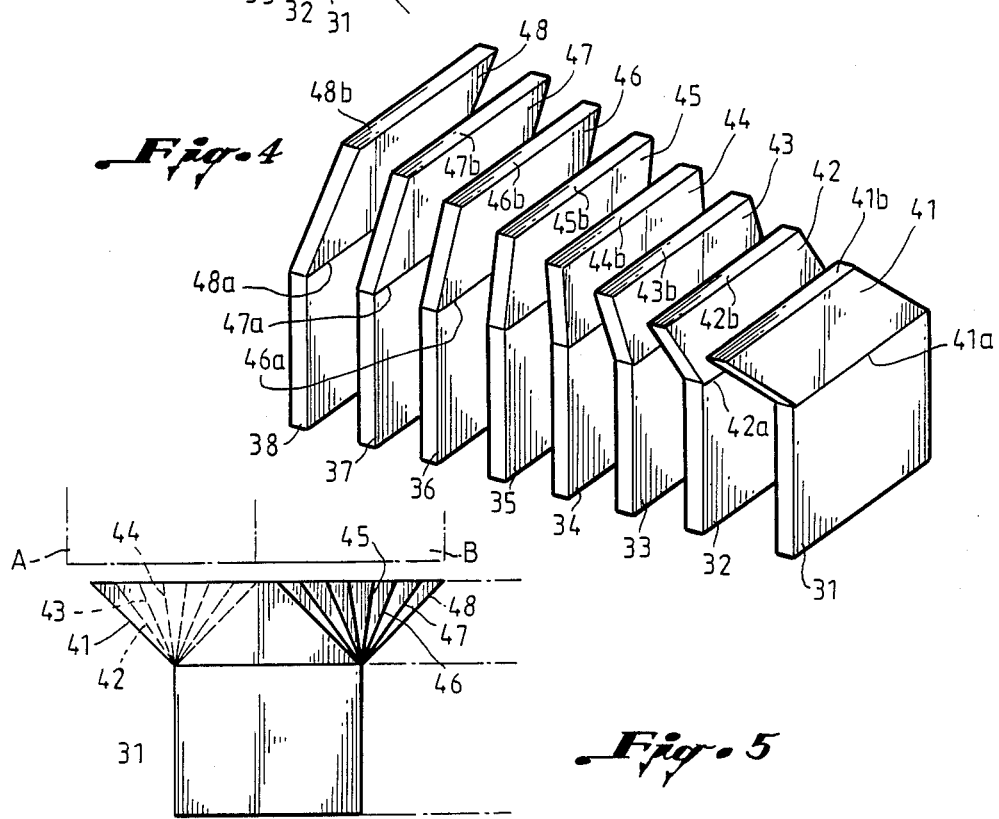

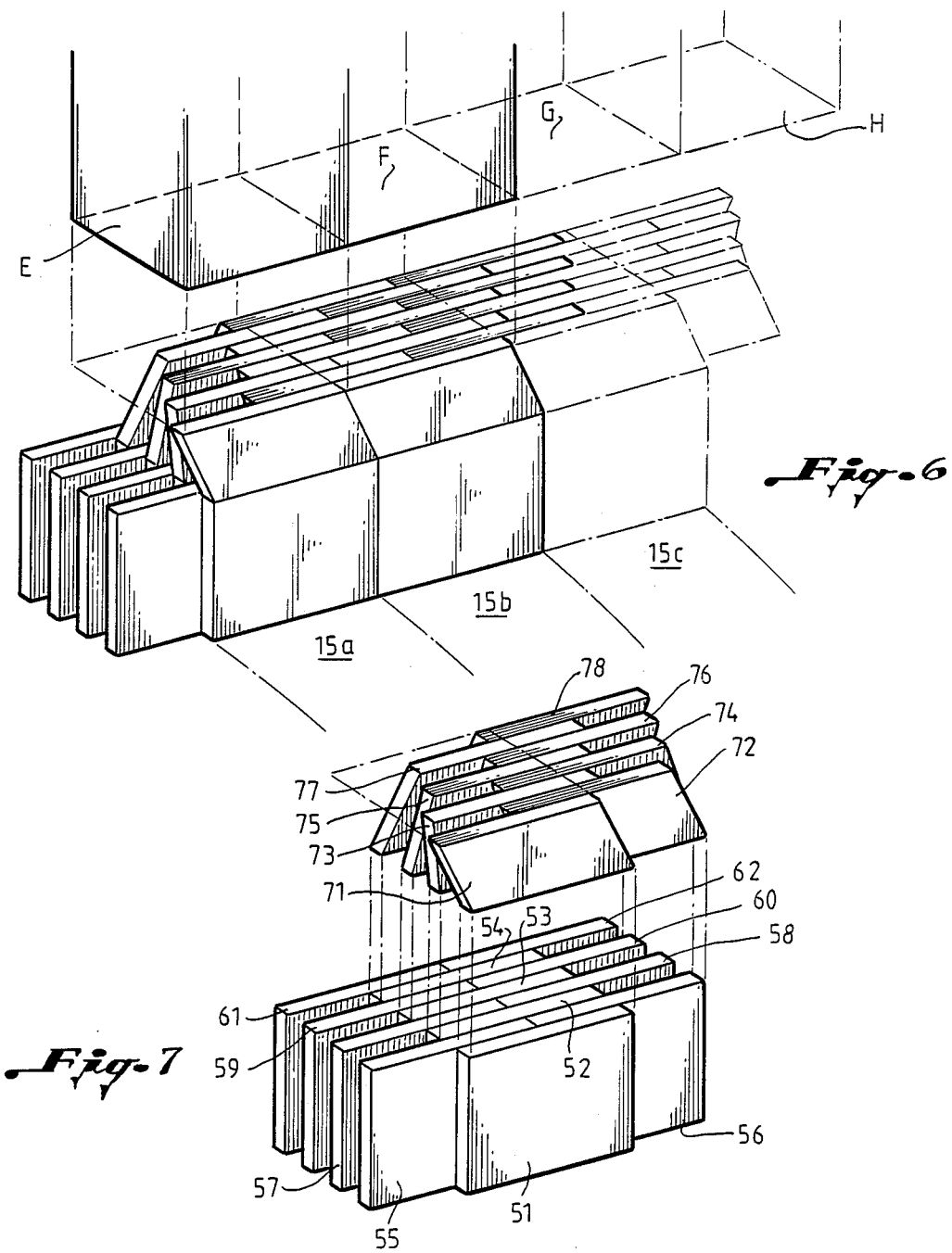
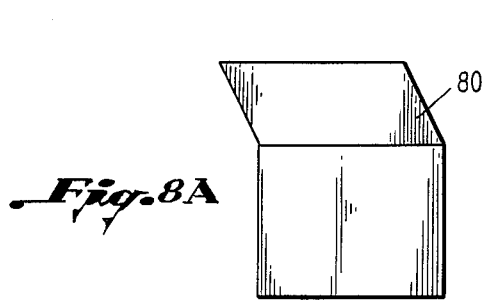

LIGHT GUIDES FOR A POSITRON EMISSION TOMOGRAPHY CAMERA

BACKGROUND OF THE INVENTION

In conventional positron emission tomography (PET) cameras, it is conventional to use a single light detector, such as a photomultiplier tube, coupled to a single scintillator crystal. However, it has been proposed in U.S. Pat. No. 4,563,582 and Great Britain Pat. No. 1,406,685 that it is advantageous to use a greater number of scintillator crystals for obtaining a more efficient and less expensive PET camera by coupling a photomultiplier tube to a plurality of scintillator crystals in which the identification of the individual crystals can be decoded by a smaller number of photomultiplier tubes. However, in some of the schemes, the crystals have to be located outside a specific plane and form a zig-zag detector ring which lowers the axial resolution or lowers the angular sampling in any cross-sectional plane which limits the ratio of crystals/PMT. Also, since the photomultiplier tubes and the crystal scintillators each have a dead space at their outer boundaries caused by boundary layers for guiding the detected radiation and light, the ratio of the number of crystals to a photomultiplier tube is limited. However, it is advantageous in a PET camera to utilize a greater number of smaller crystals for providing a greater efficiency and for eliminating the conventional mechanical wobbling of the camera by providing finer sampling by using a greater number of small crystals.

The present invention is directed to providing a plurality of slanting light guides to transfer light from the crystal scintillators to allow a minimum of light detectors to be used to decode the position of the scintillations detected by a multitude of small crystals regardless of the position of the crystals. The slanting light guides provide a coupling between the crystals and the light detectors with very high optical efficiency since the light output from each crystal only goes to a single light guide thereby reducing scatter from the crystals. The efficiency is also enhanced by having the area and shape of the entrance and exit ends of the light guides substantially the same. The light guides are arranged in a configuration to provide a high ratio of crystals to detectors.

SUMMARY

The present invention provides a slanting-light-guide (SLIG) detection system for PET. In this system, the scintillation created in each crystal is selectively and proportionally channeled into two adjacent PMT's. The difference in signal received by the two PMT then determines the position of the flashing crystal. This decoding allows accurate metering of light into the PMT even with the necessary dead spaces (e.g., glas wall) in the PMT's and crystals.

The present invention is directed to a positron emission tomography camera having a plurality of scintillation crystal planes positioned side-by-side around a patient area to detect radiation therefrom and forming adjacent rows of crystals which are transverse to said planes. Each row of each plane includes a plurality of crystals for detecting radiation.

A row of light detectors such as photomultiplier tubes are positioned adjacent each row of each crystal for receiving detected radiation from the adjacent rows of crystals and the number of light detectors in each row is greater than the number of planes of crystals. A row of light guides are positioned between each row of crystals and each row of coacting light detectors. The number of light guides are equal to the number of crystals and the guides have first and second ends with the first end of each light guide being positioned adjacent to one crystal. The second end of each light guide is positioned adjacent a row of light detectors. The second ends of the light guides are axially offset in the rows a different amount from each other for providing an identification to the light detectors of which crystal detects radiation.

Still a further object of the present invention is wherein the rows of light detectors are axially offset from the rows of crystals.

Yet a further object of the present invention is wherein the number of light detectors is one more than the number of planes of crystals.

Still a further object of the present invention is wherein the second ends of the light guides in each plane are in communication with more than one light detector.

Yet a still further object is wherein some of the light guides are mirror images of other light guides for ease of manufacture. Preferably, the light guides in elevation are parallelograms.

Still a further object of the present invention is wherein the second ends of the light guides are normally offset axially from other second ends in each row an amount of 1/n of the length of a light guide where n is the number of crystals in one row of one plane. Slight variations may occur due to the existence of dead spaces between PMT's.

A still further object is wherein some of the second ends of the light guides are offset axially in different directions from other second ends of the light guides.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 3 is an enlarged perspective elevational view of one row of scintillation crystals with their coacting light guide and the coacting light detectors in an exploded position, FIG. 4 is an enlarged exploded perspective elevational view of the arrangement of one set of scintillation crystals and light guides, FIG. 5 is an enlarged schematic elevational view of part of one row of crystals, light guides and light detectors, FIG. 6 is an enlarged exploded perspective elevational view of coacting crystals, light guides and light detectors utilizing a different arrangement of detectors, FIG. 7 is an enlarged exploded perspective elevational view of one set of the crystals and light guides of FIG. 6, FIGS. 8A and 8B are enlarged elevational views of the light guides used in the embodiment of FIGS. 6 and 7.

DESCRIPTION OF THE PREFERRED EMBODIMENT

Figure 1:
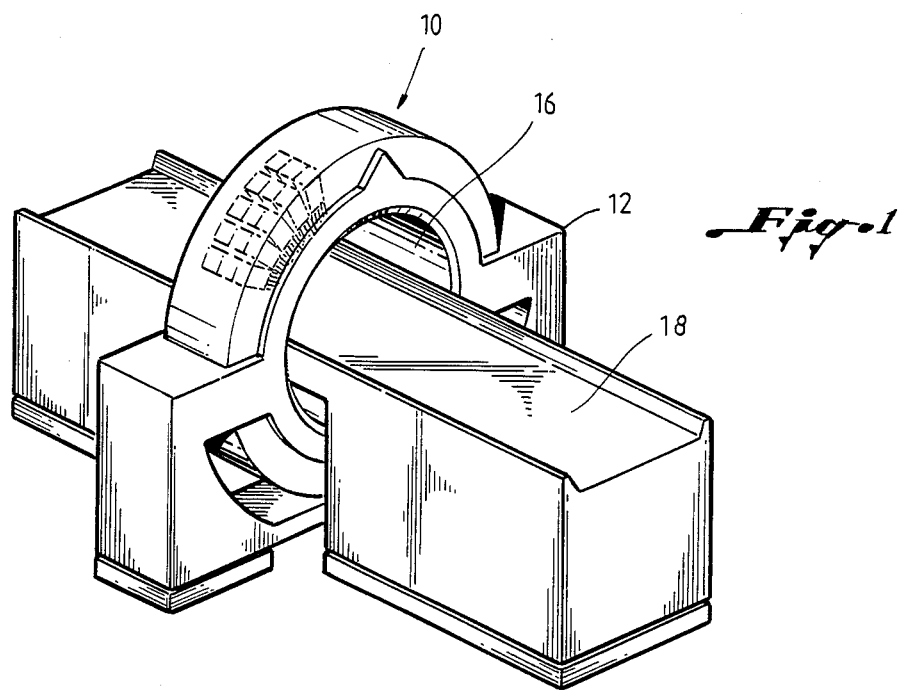
FIG. 1 is a perspective elevational view of the positron emission tomography camera of the present invention.

Referring now to the drawings, and particularly to FIG. 1, the reference numeral 10 generally indicates a positron emission tomography (PET) camera having a support or gantry 12, a plurality of planes of detectors, here shown as rings, positioned side-by-side and surrounding a patient area 16 to detect radiation therefrom. The patient area 16 may include a patient bed 18 for supporting a patient. In a PET camera, a positron isotope, such as Rb 82, is injected into the patient, each positron isotope atom then produces two gammas simultaneously and back-to-back. The detectors then capture these gammas to produce an image of the tracer distribution.

Figure 2:
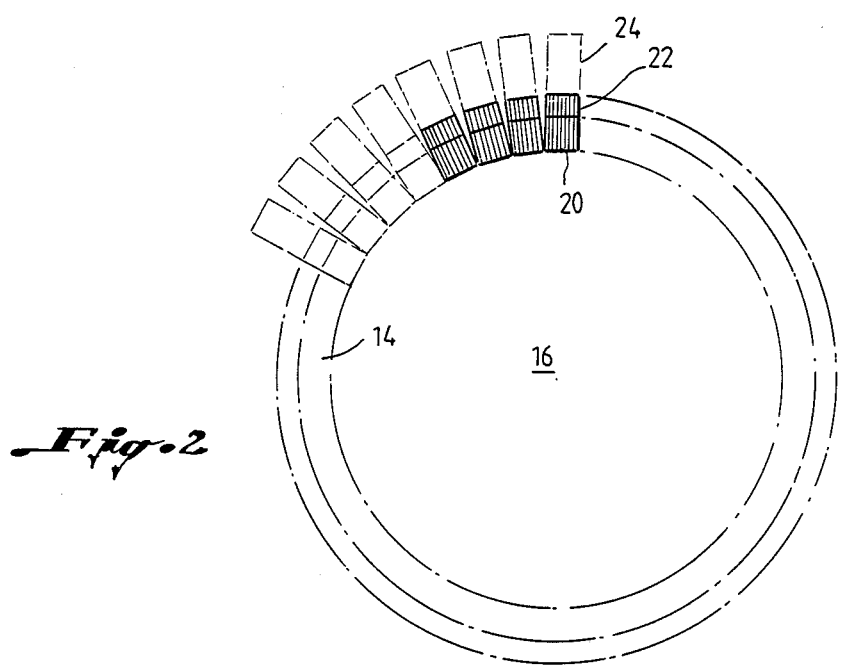
FIG. 2 is an enlarged schematic cross-sectional view of one plane of crystals, light guides and light detectors around a patient area.

Each plane, such as three planes 14, 14a, and 14b, provides a straight on slice and interplane slices between adjacent planes may be added together to provide an in-between slice between adjacent planes. Any desirable number of planes or rings 14 may be used. As best seen in FIG. 2, a single ring, such as 14, includes a plurality of scintillation crystals 20, light guides 22 and light detectors 24. The crystals may be of any suitable type such as BGO crystals and the light detectors 24 may be any suitable type such as photomultiplier tubes or silicon avalanche photodiodes.

Referring now to FIG. 3, a plurality of planes of scintillation crystals, here shown as three rings 14, 14a, and 14b, include a plurality of sets of scintillation crystals generally indicated by the reference number 20, 20a, and 20b, positioned side-by-side around the patient area 16 to detect radiation therefrom and form adjacent rows of crystals transverse to said plane. That is, a plurality of crystal sets 20, 20a and 20b form a row transverse to the planes or rings 14, 14a and 14b. Each row of each plane includes a plurality of crystals for detecting radiation. For example, in the plane 14 and in the single row consisting of sets 20, 20a, 20b, eight crystals 31–38 may be provided in set 20. Similarly, eight crystals are provided in the same row of the sets of scintillation crystals 20a and 20b.

A row of light detectors are positioned adjacent each row of crystals for receiving detected radiation from the adjacent row of crystals, and as shown in FIG. 3, the row includes photomultiplier tubes A, B, C and D. In order to detect which of the crystals in each ring 14, 14a and 14b has detected a radiation, it is desirable that the number of light detectors A, B, C and D in each row is greater than the number of planes 14, 14a, and 14b of crystals as will be more fully discussed hereinafter. In the embodiment shown in FIG. 3, four PMT's may be used with the light guide system of the present invention to detect which of the twenty-four crystals of the sets 20, 20a, and 20b in the row has detected radiation.

A row of light guides is positioned between the row of crystal sets consisting of crystals 20, 20a and 20b and the row of detectors consisting of detectors A, B, C and D. The number of light guides is equal to the number of crystals and the guides have first and second ends. The first and second ends are substantially the same in area and shape. The first end of each light guide is positioned adjacent to one crystal and the second end of each light guide being positioned adjacent the row of light detectors. Thus, a set of light guides 41–48 are provided having their first ends 41a–48a positioned adjacent the top of crystals 31–38, respectively. The second ends of the light guides 41–48, being ends 41b–48b, are positioned adjacent the bottom of the row of the light detectors A, B, C and D. The second ends 41b–48b of the light guides 41–48 are offset longitudinally in each row a different amount from each other for providing an identification to the light detectors of which crystal detects radiation. Preferably, the light guides 41–48 are parallelogram-shaped in elevation for higher light conductance. However, the light guides may be slightly different from the parallelogram shape to accommodate dead spaces (i.e., glass walls) between the PMT's and crystals. In the parallelogram shape, the slant angle should be no more than 25 degrees for preventing light loss. It is also to be noted that for ease of manufacture only four light guides need be manufactured as the other four light guides are mirror image of the first four, but are merely reversed. That is, light guides 41 and 48 are identical but reversed, 42 and 47 are identical but reversed, 43 and 46 are identical but reversed and 44 and 45 are identical but reversed. Referring now to FIGS. 3 and 5, it is to be noted that it is preferable that the row of light detectors A, B, C and D are not vertically aligned but are longitudinal offset from the row of crystals sets 20, 20a and 20b. That is, detector A is not vertically aligned with plane 14 but is offset for ease of decoding the crystals.

The light guides 41–48 allow a row of detectors to decode a row of small crystals such as each row having a set of eight crystals in each plane and will allow the PET camera 10 to provide fine sampling, eliminate the requirement for mechanically wobbling the gantry 12, and will overcome the normal dead space (not shown) between adjacent light detectors and between adjacent crystals.

In the event crystal 31 detects radiation and emits light to the light guide 41, an electrical signal is created in detectors A and B with the magnitude of the signal in A being $\frac{7}{8}$ths and the magnitude of the signal in detector B being $\frac{1}{8}$th. Radiation detection in crystal 32 is transmitted to light guide 42 which produces a signal in detector A of a magnitude of $\frac{6}{8}$ths and a signal in detector B of $\frac{2}{8}$th. Crystal 33 transmits light through guide 43 which provides a signal magnitude of $\frac{5}{8}$ths in detector A and $\frac{3}{8}$ths in detector B. The other crystals similarly provide distinctive outputs to the detectors for allowing the detectors to correctly identify which of the crystals detects radiation. The last crystal 38 in the set transmits light through guide 48 which provides no signal to detector A but a magnitude of 8/8ths to detector B. Therefore, the use of the light guides 41–48 allows four detectors A, B, C and D to correctly identify twenty-four crystals. Of course, the system can be expanded to provide additional planes of crystals by increasing the length of the rows of crystals, light guides and detectors.

The crystals and light guides may be of any suitable materials. For example, only the crystals may be BGO and the light guides may be BGO or a suitable thermoplastic polymer such as sold under the trademark PLEXIGLAS. In one embodiment the crystals were 3 cm tall and 1 cm wide and the guides were 1 cm tall and 1 cm wide. The thickness depends on the size of the PMT's.

In FIGS. 3–5, the arrangement of the crystal sets 20, 20a and 20b in each of the planes 14, 14a and 14b, respectively, is one type of conventional crystal arrangement with the crystals being positioned in a non-staggered arrangement relative to each other. However, the light guides of the present invention may be used advantageously with a staggered arrangement of crystals which may be desirable in some applications. Referring now to FIGS. 6–8B an arrangement of light guides for accommodating a staggered arrangement of crystals is best seen. Thus, a plurality of crystal rings are planes 15a, 15b, 15c are provided around a patient area forming adjacent rows of crystals transverse to the planes. Again, each row of crystals may consist of a set of crystals with each row of each plane having a plurality of crystals for detecting radiation. For example, the row may include eight thicknesses of crystals. Thus, one or more planes, such as plane 15a, may consist of all of crystals 51, 52, 53, and 54, as well as portions of staggered crystals 55, 56, 57, 58, 59, 60, 61, and 62. Again, a set of light guides 71–78 are provided having their first ends adjacent and coacting with one crystal and their second ends being positioned adjacent the row of light detectors E, F, G and H. A signal of 8/8 magnitude received by detector E is an indication of crystal 51. A signal of the magnitude of $\frac{2}{3}$ to both detector E and detector F is an indication of a signal from crystal 56. A signal of a magnitude of $\frac{2}{3}$ths in detector E and $\frac{1}{3}$th in detector F is an indication of a detection by crystal 52. Similarly, decoding of the other crystals provides a distinctive signal to the row of detectors E, F, G and H. Again, preferably the light guides 71–78 are parallelogram-shaped in elevation, some of the light guides are mirror images of the other light guides and some of the second ends of the light guide are longitudinally offset in different directions. In the embodiment shown in FIGS. 6–8B only two unsimilar shaped light guides need be used. Thus, the light guide 80 of FIG. 8A is identical to the light guides 71, 72, 77 and 78. While the light guide 82 shown in FIG. 8B is identical to the light guides 73, 74, 75 and 76 with the guides 75 and 76 being reversed in direction relative to guides 73 and 74.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts will be readily apparent to those skilled in the art and which are encompassed within the spirit of the invention and the scope of the appended claims.

What is claimed is:

1. A positron emission tomography camera comprising, a plurality of scintillation crystals in planes which are positioned side-by-side around a patient area to detect radiation therefrom and forming adjacent rows of crystals transverse to said planes, each row of each plane having a plurality of crystals for detecting radiation and a row of light detectors positioned adjacent each row of crystals for receiving detected radiation from the adjacent row of crystals, the number of light detectors in each row being greater than the number of planes of crystals, a row of light guides positioned between each row of crystals and each row of coacting light detectors, the number of light guides being equal to the number of crystals, said guides having first and second ends with the first end of each light guide being positioned adjacent to one crystal, and the second end of each light guide being positioned adjacent a row of light detectors, and the second ends of said light guides being offset longitudinally in the row a different amount from each other for providing an identification to the light detectors of which crystal detects radiation.

2. The apparatus of claim 1 wherein the rows of light detectors are longitudinally offset from the rows of crystals.

3. The apparatus of claim 1 wherein the number of light detectors is one more than the number of planes of crystals.

4. The apparatus of claim 1 wherein some of the second ends of the light guides in each plane are positioned adjacent more than one light detector.

5. The apparatus of claim 1 wherein some of the light guides are mirror images of other light guides.

6. The apparatus of claim 1 wherein the first and second ends of the light guides are substantially the same in size and shape.

7. The apparatus of claim 1 wherein the light guides are in elevation parallelograms.

8. The apparatus of claim 1 wherein the second ends of the light guides are offset longitudinally from other second ends in each row an amount of 1/n of the length of a crystal where n is the number of crystals in one row of one plane.

9. The apparatus of claim 1 wherein some of the second ends of the light guides are offset longitudinally in different directions.

* * * * *